United States Patent
Ito et al.

(10) Patent No.: US 8,127,793 B2
(45) Date of Patent: Mar. 6, 2012

(54) ROTARY VALVE APPARATUS

(75) Inventors: Yoshikuni Ito, Nagoya (JP); Toru Fujikawa, Obu (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/120,280

(22) PCT Filed: Dec. 7, 2009

(86) PCT No.: PCT/JP2009/070478
§ 371 (c)(1),
(2), (4) Date: Mar. 22, 2011

(87) PCT Pub. No.: WO2010/073898
PCT Pub. Date: Jul. 1, 2010

(65) Prior Publication Data
US 2011/0180738 A1    Jul. 28, 2011

(30) Foreign Application Priority Data

Dec. 22, 2008   (JP) .................. 2008-326270

(51) Int. Cl.
*F16K 11/08* (2006.01)
(52) U.S. Cl. .............. 137/625.47; 251/287; 251/304

(58) Field of Classification Search ............ 137/625.43, 137/625.46, 625.47; 251/287, 304, 305, 251/309, 313
See application file for complete search history.

(56) References Cited

U.S. PATENT DOCUMENTS 3,066,908 A * 12/1962 Floren et al. .................. 251/287
(Continued)

FOREIGN PATENT DOCUMENTS

JP          60-008584 U        1/1985
(Continued)

OTHER PUBLICATIONS

International Search Report (PCT/ISA/210) issued on Feb. 23, 2010, by Japanese Patent Office as the International Searching Authority for International Application No. PCT/JP2009/070478.

(Continued)

*Primary Examiner* — John Fox
(74) *Attorney, Agent, or Firm* — Buchanan Ingersoll & Rooney PC

(57) ABSTRACT

A rotary valve apparatus includes a casing having a fluid passageway, a rotor rotatably mounted in the casing and configured to control, by rotation thereof, a flow state of fluid flowing in the fluid passageway, a drive mechanism for rotating the rotor, and a lock mechanism configured to allow transmission of a rotational force from the drive mechanism to the rotor and to inhibit rotation of the rotor under non-rotation driving state of the driving mechanism.

8 Claims, 4 Drawing Sheets

U.S. PATENT DOCUMENTS

| | | | | |
|---|---|---|---|---|
| 4,679,983 | A | * | 7/1987 | Pietryk et al. ............... 415/148 |
| 4,809,949 | A | * | 3/1989 | Rakieski ...................... 251/310 |
| 5,000,422 | A | * | 3/1991 | Houston ...................... 251/306 |
| 6,098,957 | A | * | 8/2000 | Vepy ........................ 251/129.12 |
| 6,216,736 | B1 | * | 4/2001 | Benedetti ................. 137/625.47 |
| 6,267,352 | B1 | * | 7/2001 | Semeyn et al. .......... 251/129.12 |
| 6,497,250 | B1 | * | 12/2002 | Johann ..................... 137/625.46 |

FOREIGN PATENT DOCUMENTS

| | | |
|---|---|---|
| JP | 2-090466 U | 7/1990 |
| JP | 4-056274 U | 5/1992 |
| JP | 5-141571 A | 6/1993 |
| JP | 6-281025 A | 10/1994 |
| JP | 7-269740 A | 10/1995 |
| JP | 8-254110 A | 10/1996 |
| JP | 9-317937 A | 12/1997 |
| JP | 2003-240155 A | 8/2003 |
| JP | 2003-343746 A | 12/2003 |
| JP | 2005-083203 A | 3/2005 |
| JP | 2005-113873 A | 4/2005 |

OTHER PUBLICATIONS

Written Opinion (PCT/ISA/237) issued on Feb. 23, 2010, by Japanese Patent Office as the International Searching Authority for International Application No. PCT/JP2009/070478.

Notification of Transmittal of Translation of the International Preliminary Report on Patentability (Form PCT/IB/338) dated Jul. 14, 2011, International Preliminary Report of Patentability (Form PCT/IB/373) and Written Opinion of the International Searching Authority (Form PCT/ISA/237) dated Jul. 5, 2011, issued in corresponding International Patent Application No. PCT/JP2009/070478.

* cited by examiner

ROTARY VALVE APPARATUS

TECHNICAL FIELD

The present invention relates to a rotary valve apparatus having good sealing performance.

BACKGROUND ART

There is known a rotary valve consisting of a rotor defining a fluid transport passageway and a casing rotatably housing the rotor and configured such that the valve can be switched over between an opened state in which a plurality of ports formed in the case are communicated with each other through the passageway and a closed state in which the ports are blocked.

During rotation of the rotor of the rotary valve, sliding resistance of a port seal is generated relative to the casing. For this reason, a large driving force is needed for rotating the rotor during switchover of the rotary valve. This need invites enlargement of the rotary valve apparatus. Further, for obtaining such large driving force, a large amount of electric power is consumed. So, when such rotary valve is mounted in a vehicle, there is a concern about deterioration of the fuel consumption efficiency.

In the case of a rotary valve disclosed in Patent Document 1, in an attempt to decrease the sliding resistance, the center of curvature radius of the port seal portion is offset so as to allow the rotor to rotate without sliding against the casing, when the rotary valve is switched from the closed state to the opened state.

Further, in the case of a rotary valve disclosed in Patent Document 2, in an attempt to decrease the sliding resistance, a recess is formed in at least either one of an inner peripheral face of the casing and an outer peripheral face of a rotational member of the rotary valve, thereby to decrease the area of the contact between the casing and the rotational member.

PRIOR ART DOCUMENT

Patent Documents

Patent Document 1: Japanese Patent Application "Kokai" No. 2005-113873
Patent Document 2: Japanese Patent Application "Kokai" No. 2003-343746

SUMMARY OF THE INVENTION

In Patent Documents 1 and 2, attempts are made indeed to reduce the sliding resistance of the port seal. However, in Patent Document 1, when the rotary valve is switched from the opened sate to the closed state, the rotor rotates while receiving the sliding resistance between the port seal portion and the casing. Further, in Patent Document 2 also, although the sliding resistance between the rotational member of the rotary valve and the casing is reduced to a half approximately, a certain amount of sliding resistance still occurs during rotation of the rotational member.

On the other hand, if the contacting face between the rotor and the casing is reduced excessively in order to reduce the sliding resistance generated between the rotor and the casing, this allows indeed the rotor to rotate with a smaller driving force; however, when the motor as the driving source for the rotor is stopped, the rotor will rotate as receiving the effect of the fluid, so the sealing condition during switchover of the rotary valve cannot be maintained.

Then, the object of the present invention is to provide a rotary valve apparatus having good sealing performance while allowing rotation of a rotor with a small driving force.

According to the first characterizing feature of a rotary valve apparatus relating to the present invention, the rotary valve apparatus comprises:

a casing having a fluid passageway;
a rotor rotatably mounted in the casing and configured to control, by rotation thereof, a flow state of fluid flowing in the fluid passageway;
a drive mechanism for rotating the rotor; and
a lock mechanism configured to allow transmission of a rotational force from the drive mechanism to the rotor and to inhibit rotation of the rotor under non-rotation driving state of the driving mechanism.

With the above-described construction, the rotor is rotated only by the driving force of the drive mechanism; and under non-rotation driving state of the driving mechanism, the lock mechanism is effective to inhibit rotation. Therefore, even when a motor of the drive mechanism is stopped, the position of the rotor is maintained and the current flowing state of the fluid is maintained. With this, even when the motor is stopped, it is still possible to maintain the flowing condition of the rotary valve, so that the electric power consumption can be reduced significantly.

According to the second characterizing feature of the rotary valve apparatus relating to the present invention, said lock mechanism is incorporated in a rotational force transmission pathway from said drive mechanism.

With this construction, the rotational force from the drive mechanism is transmitted to the rotor while the lock mechanism is not operative, and under the non-rotation driving state of the driving mechanism, the rotational force from the rotor is inhibited by the activated locking function, thus inhibiting rotation of the rotor. With this inhibition of rotation of the rotor, the drive mechanism is not exposed to the load due to the rotational force of the rotor. As a result, the durability of the rotary valve apparatus can be improved.

According to the third characterizing feature of the rotary valve apparatus relating to the present invention, said lock mechanism inhibits the rotation of the rotor even when the fluid pressure of the fluid is applied to this rotor.

With this construction, under non-rotation driving state of the driving mechanism even if the fluid pressure of fluid is applied to the rotor, the lock mechanism inhibits rotation of the rotor. Therefore, even when the motor of the drive mechanism is stopped, the position of the rotor can be maintained without being affected by the fluid pressure of the fluid, so that the flowing condition of the fluid can be maintained in a reliable manner.

According to the fourth characterizing feature of the rotary valve apparatus according to the present invention, said fluid passageway includes at least a first fluid passageway and a second fluid passageway; and said rotor being configured to control, by rotation thereof, the flow state of the fluid such that the fluid is caused to flow through either one of said first fluid passageway and said second flow passageway.

With this construction, with rotation of the rotor, one of the first fluid passageway and the second fluid passageway can be selected, so that the fluid passageway control of the rotary valve can be made simple.

According to the fifth characterizing feature of the rotary valve apparatus relating to the present invention, said fluid passageway includes a first communication orifice, a second communication orifice, and a third communication orifice;

said first fluid passageway includes said first communication orifice, said third communication orifice and a first communication passageway communicating said first communication orifice to said third communication orifice, and said second fluid passageway includes said second communication orifice, said third communication orifice and a second communication passageway communicating said second communication orifice to said third communication orifice.

With this construction, in a rotary valve having three communication orifices, selection is possible between the first communication passageway which communicates the first communication orifice to the third communication orifice and the second communication passageway which communicates the second communication orifice and the third communication orifice. So, the switchover to the first fluid passageway or the switchover to the second fluid passageway can be made in a reliable manner.

According to the sixth characterizing feature of the rotary valve apparatus relating to the present invention, said casing includes an accommodating space for accommodating said rotor;

said accommodating space is surrounded by an inner peripheral wall coaxial with a rotational shaft of said rotor;

said inner peripheral wall includes a first projecting portion and a second projecting portion that project into said accommodating space and oppose to each other across said rotational shaft; and leading ends of said first projecting portion and said second projecting portion form an arcuate shape coaxial with said rotational shaft in a cross section perpendicular to said rotational shaft.

With this construction, when the rotor rotates clockwise or counterclockwise in the peripheral direction, this rotor come into contact with the first projecting portion and the second projecting portion of the inner peripheral wall, thus being unable to rotate any further.

That is, the first projecting portion and the second projecting portion function as a stopper, and the rotor is stopped at their positions, so it is possible to set such that the rotary valve is switched to the first fluid passageway or the second fluid passageway at the position where the rotor comes into contact with the first projecting portion and the second projecting portion.

Further, as the leading ends of the first projecting portion and the second projecting portion form an arcuate shape coaxial with the rotational shaft in a cross section perpendicular to the rotational shaft, there can be formed an appropriate amount of clearance between the rotor and the projecting portions of the casing, so the rotor can be rotated without any contact with the first and second projecting portions until the rotor come into contact with these projecting portions.

According to the seventh characterizing feature of the rotary valve according to the present invention, the rotary valve further comprises a sealing portion which is rendered into a sealing state when said rotor and said casing come into contact with each other as a result of the rotation of the rotor; and an urging mechanism provided between said lock mechanism and said rotor for maintaining said rotor under said sealing state.

With the above sealing portion, the sealing state between the rotor and the casing in the rotary valve is maintained, so the risk of leaking of the fluid through a gap between the rotor and the casing into a different flow passageway can be reduced.

Further, as an urging mechanism is provided between the lock mechanism and the rotor for maintaining the rotor under said sealing state, the shock applied to the rotational shaft of the rotary valve due to the reaction force resulting form the sealing portion coming into contact with the casing is received by this urging mechanism. And, the sealing portion of the rotor further presses the casing by the driving force of the drive mechanism, the motor torque of the drive mechanism is accumulated in the urging mechanism. Hence, even when the motor is stopped, this urging mechanism serves to maintain the rotor under the sealing state. As a result, the sealing performance between the rotor and the casing in the rotary valve is improved.

According to the eighth characterizing feature of the rotary valve according to the present invention, said first projecting portion includes a first peripheral end face on one side in the peripheral direction of this first projecting portion and a second peripheral end face on the other side in the peripheral direction of this first projecting portion;

said second projecting portion includes a third peripheral end face located on one side in the peripheral direction of this second projecting portion and in opposition to said first peripheral end face and a fourth peripheral end face located on the other side in the peripheral direction of this second projecting portion and in opposition to said second peripheral end face;

said rotor includes a first partitioning portion disposed on one side in the direction perpendicular to said rotational shaft across this rotational shaft and a second partitioning portion disposed on the other side in the direction perpendicular to said rotational shaft;

said first partitioning portion and said second partitioning portion each has a planar shape extending at least in the axial direction of said rotational shaft;

said first partitioning portion includes a first contacting portion formed in one side thereof contactable with at least said first peripheral end face of said first projecting portion and a second contacting portion formed on the other side thereof contactable with at least said third peripheral end face of said second projecting portion;

said second partitioning portion includes a third contacting portion formed in one side thereof contactable with at least said first peripheral end face of said first projecting portion and a fourth contacting portion formed on the other side thereof contactable with at least said third peripheral end face of said second projecting portion;

in response to rotation of said rotor in one direction, said first contacting portion of said first partitioning portion comes into contact with said first peripheral end face of said first projecting portion and said fourth contacting portion of said second partitioning portion comes into contact with said fourth peripheral end face of said second projecting portion, thereby to provide a sealing state for blocking communication between said first fluid passageway and said second fluid passageway; and in response to rotation of said rotor in the other direction, said second contacting portion of said first partitioning portion comes into contact with said third peripheral end face of said second projecting portion and said third contacting portion of said second partitioning portion comes into contact with said second peripheral end face of said first projecting portion, thereby to provide a sealing state for blocking communication between said first fluid passageway and said second fluid passageway.

With this construction, in response to rotation of the rotor in one direction, the first contacting portion of the first partitioning portion comes into contact with the first peripheral end face of the first projecting portion and the fourth contacting portion of the second partitioning portion comes into contact with the fourth peripheral end face of the second projecting portion, thereby to provide a sealing state for blocking communication between the first fluid passageway and the second fluid passageway. And, in response to rotation of the rotor in the other direction, the second contacting portion of the first partitioning portion comes into contact with the third peripheral end face of the second projecting portion and the third contacting portion of the second partitioning portion comes into contact with the second peripheral end face of the first projecting portion, thereby to provide a sealing state for blocking communication between the first fluid passageway and the second fluid passageway. Therefore, while allowing reliable switching of the rotary valve to either the first fluid passageway or the second fluid passageway, leak of the fluid to a different fluid passageway can be prevented.

According to the ninth characterizing feature of the rotary valve apparatus according to the present invention, said lock mechanism includes a worm gear.

With this construction, while the rotational shaft of the rotary valve can be rotated by the driving force of the motor, the worm gear will not be rotated even if the rotational shaft of the rotary valve tends to be rotated conversely by an external force for example. With this, under the sealing state of the rotary valve, the position of the rotational shaft of the rotor is maintained; thus, reliable sealing performance can be maintained.

According to the tenth characterizing feature of the rotary valve according to the present invention, said urging mechanism includes a spring.

With this construction, the urging mechanism of the rotary valve apparatus can be formed simple.

According to the eleventh characterizing feature of the rotary valve apparatus according to the present invention, said sealing portion includes an elastic member.

With this construction, the shock that is generated when the rotor comes into contact with the casing can be effectively absorbed by the elasticity of this sealing portion. Further, under the sealing state of the rotary valve apparatus also, as the elastic member is deformed and depressed, the sealing performance can be even further improved.

MODES OF EMBODYING THE INVENTION

Next, embodiments of the present invention will be explained with reference to the accompanying drawings.

Figure 1:
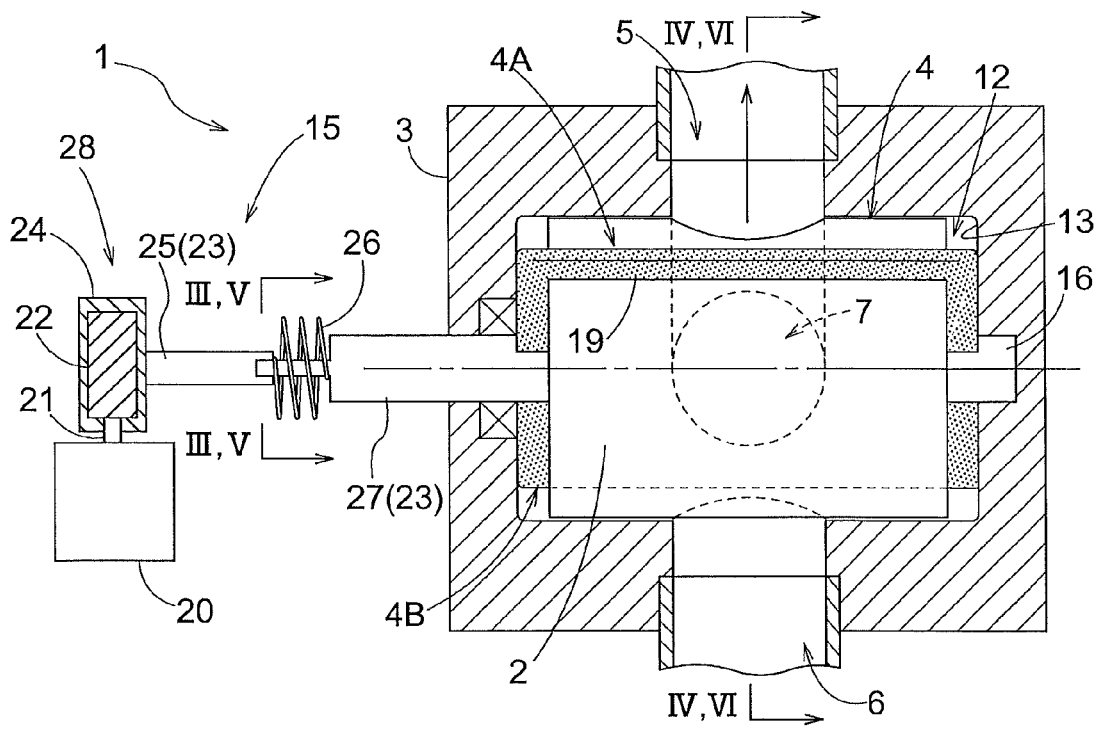
FIG. 1 is an overall diagram showing a rotary valve apparatus according to the present invention.
Figure 2:
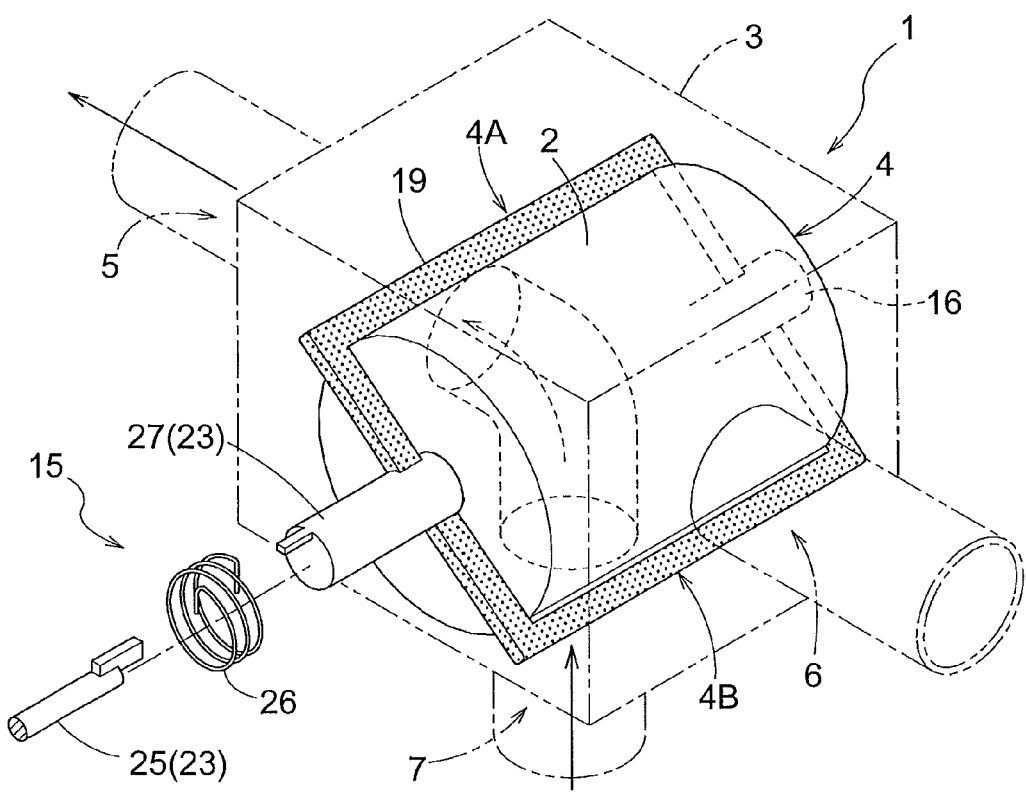
FIG. 2 is a perspective view of a rotary valve.
Figure 3:
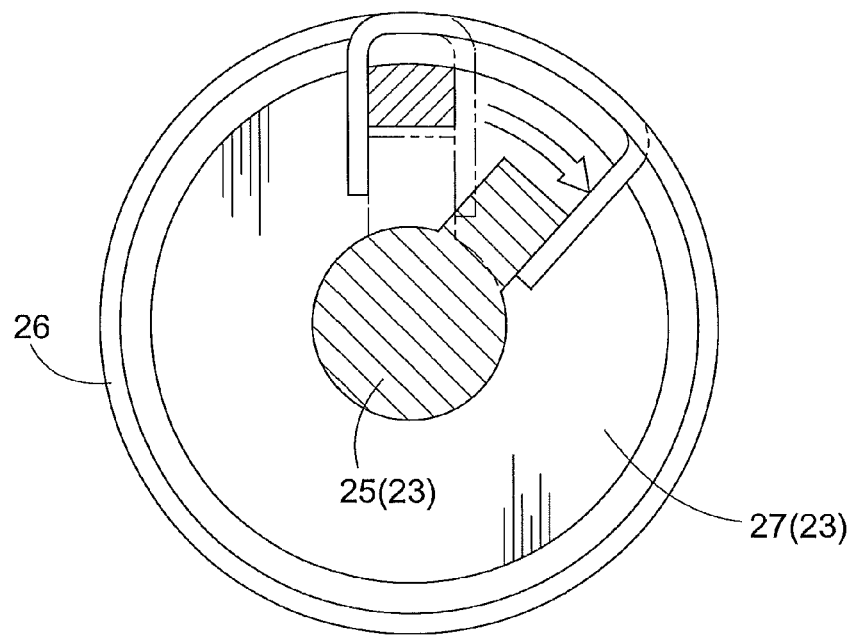
FIG. 3 is a function diagram of an urging mechanism of the valve.
Figure 4:
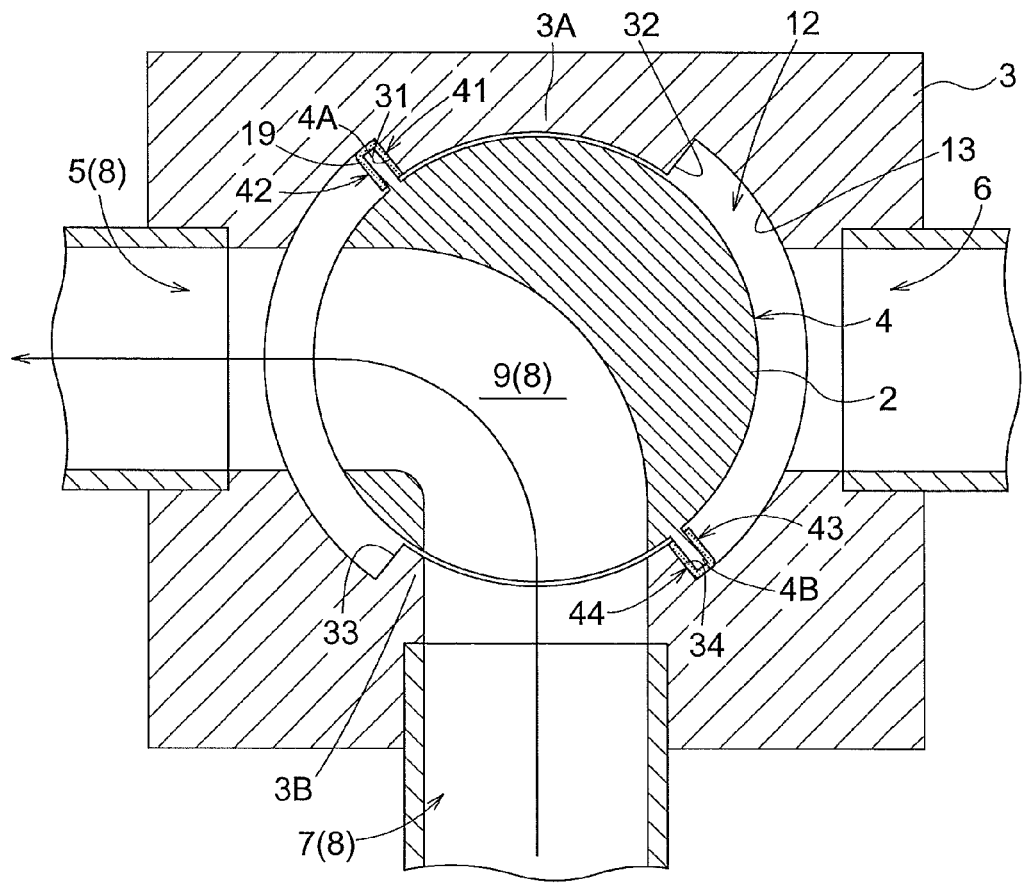
FIG. 4 is a side view in section illustrating function of the rotary valve.
Figure 5:
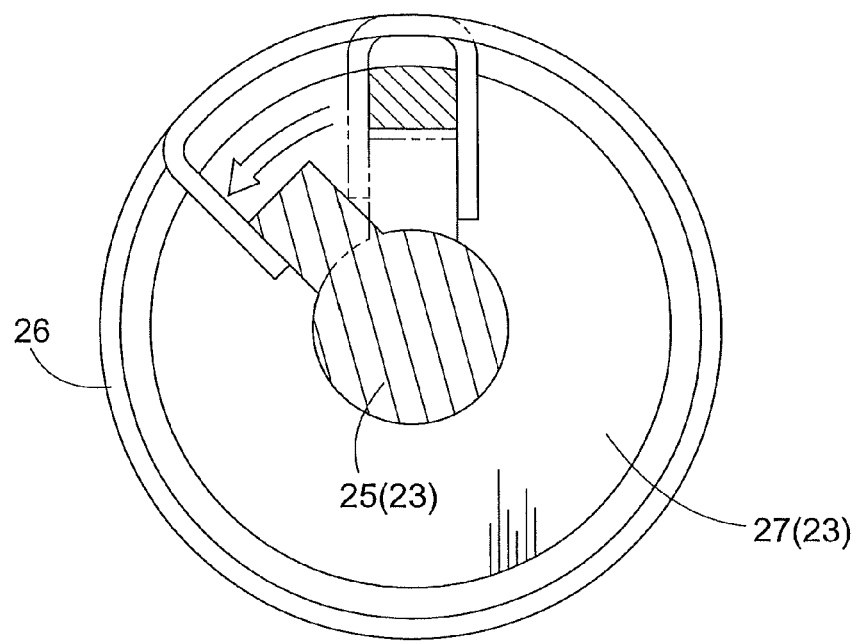
FIG. 5 is a function diagram of the urging mechanism of the valve.
Figure 6:
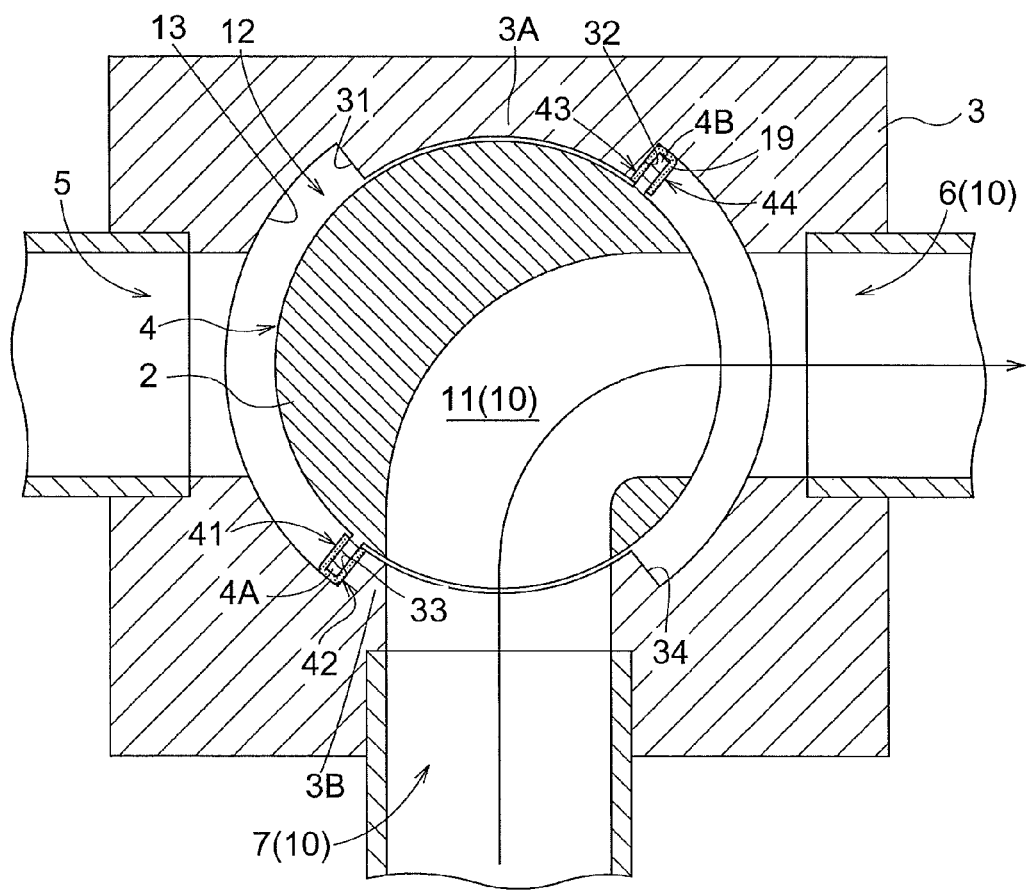
FIG. 6 is a side view in section illustrating function of the rotary valve.
Figure 7:
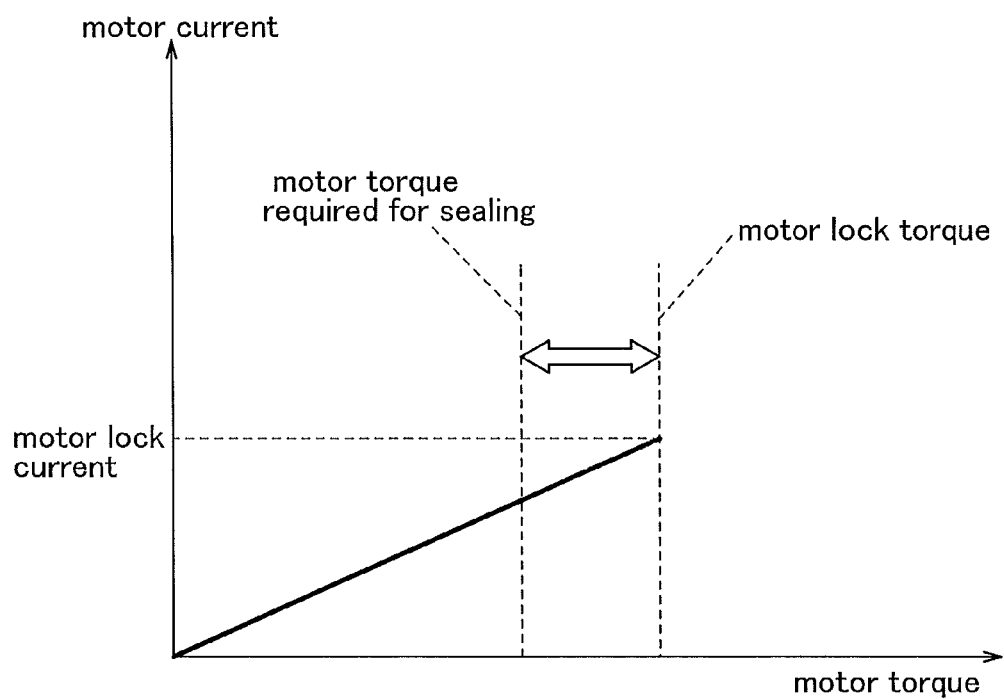
FIG. 7 is a graph showing relationship between a motor torque and a motor electric power.

FIG. 1 is an overall diagram showing a rotary valve apparatus. FIG. 2 is a perspective view of a rotary valve having a rotor accommodated in a casing. FIG. 3 and FIG. 5 are function diagrams of an urging mechanism of the valve. FIG. 4 and FIG. 6 are side views in section illustrating the function of the rotary valve. FIG. 7 is a graph showing relationship between a motor torque and a motor electric power.

Embodiment 1

A rotary valve 1 constituting a rotary valve apparatus according to the present invention includes, as shown in FIG. 2, a casing 3 having a fluid passageway, and a rotor 4 rotatably mounted in the casing 3 and configured to control, through rotation thereof, the flowing state of fluid flowing in the fluid passageway.

The casing 3 includes three orifices: a first communication orifice 5, a second communication orifice 6 and a third communication orifice 7. Further, the casing 3 includes two fluid passageways. A first fluid passageway 8, as one of them, includes the first communication orifice 5, the third communication orifice 7 and a first communication passageway 9 communicating between the first communication orifice 5 and the third communication orifice 7. A second fluid passageway 10, the other of them, includes the second communication orifice 6 and the third communication orifice 7 and a second communication passageway 11 communicating between the second communication orifice 6 and the third communication orifice 7.

The casing 3 further includes an accommodating space 12 for accommodating the rotor 4. The accommodating space 12 is surrounded by an inner peripheral wall 13 coaxial with a rotational shaft 16 of the rotor 4. The inner peripheral wall 13 includes a first projecting portion 3A and a second projecting portion 3B that project into the accommodating space 12 and oppose to each other across the rotational shaft 16. The leading ends of the first projecting portion 3A and the second projecting portion 3B form an arcuate shape coaxial with the rotational shaft 16 in a cross section perpendicular to the rotational shaft 16.

The first projecting portion 3A of the casing 3 includes a first peripheral end face 31 on one side in the peripheral direction of this first projecting portion 3A and a second peripheral end face 32 on the other side in the peripheral direction of this first projecting portion 3A. The second projecting portion 3B includes a third peripheral end face 33 located on one side in the peripheral direction of this second projecting portion 3B and in opposition to the first peripheral end face 31 and a fourth peripheral end face 34 located on the other side in the peripheral direction of this second projecting portion 3B and in opposition to the second peripheral end face 32.

The rotor 4 includes the rotational shaft 16 receiving a rotational force from a drive mechanism 15, an approximately cylindrical rotor body 2 defining a fluid transport passageway, a plate-like, first partitioning portion 4A disposed on one side in the direction perpendicular to the rotational shaft 16 across this rotational shaft 16 and a plate-like, second partitioning portion 4B disposed on the other side in the direction perpendicular to the rotational shaft 16. The first partitioning portion 4A and the second partitioning portion 4B each has a planar shape extending in the axial direction and the radial direction of the rotational shaft 16.

Further, the first partitioning portion 4A of the rotor 4 includes a first contacting portion 41 formed in one side thereof contactable with the first peripheral end face 31 of the first projecting portion 3A and a second contacting portion 42 formed on the other side thereof contactable with the third peripheral end face 33 of the second projecting portion 3B The second partitioning portion 4B of the rotor 4 includes a third contacting portion 43 formed in one side thereof contactable with the first peripheral end face 31 of the first projecting portion 3A and a fourth contacting portion 44 formed on the other side thereof contactable with the third peripheral end face 33 of the second projecting portion 3B.

At portions where the first partitioning portion 4A and the second partitioning portion 4B of the rotor 4 and the first projecting portion 3A and the second projecting portion 3B of the casing 3 come into contact, a sealing portion 19 formed of an elastic member is provided. In this embodiment, the sealing portion 19 is provided on the partitioning portions 4A, 4B side of the rotor 4. However, the sealing portion 19 may also be provided on the projecting portions 3A, 3B side of the casing. Further alternatively, the sealing portion may be provided on both the partitioning portions 4A, 4B side and on the projecting portions 3A, 3B side.

The drive mechanism 15 for rotatably driving the rotor 4 includes a motor 20, a worm gear 22 provided on a drive shaft 21 side of the motor 20, and a helical gear (worm wheel) 24 disposed on a rotational shaft 23 of the rotary valve 1.

Switchover of fluid passageways by the rotary valve 1 is effected by rotation of the motor 20 of the drive mechanism 15. The drive force of the drive mechanism 15 is transmitted from the worm gear 22 to the helical gear 24 to rotate a rotary valve rotational shaft 25 of the drive shaft 21 side and this force rotates a driven side, rotational shaft 27 of the rotary valve 1 via an elastic member 26, thereby to switchover the fluid passageway of the rotary valve 1 as illustrated in FIG. 4 or FIG. 6.

In FIG. 4, the rotary valve 1 is switched over to cause the fluid to flow through the first fluid passageway 8 communicated to the first communication orifice 5 and the third communication orifice 7. The operation of the rotary valve apparatus in the case will be explained next.

As shown in FIG. 4, in response to clockwise rotation of the rotor 4, the first contacting portion 41 of the first partitioning portion 4A of the rotor 4 comes into contact with the first peripheral end face 31 of the first projecting portion 3A and the fourth contacting portion 44 of the second partitioning portion 4B comes into contact with the fourth peripheral end face 34 of the second projecting portion 4B. With these, the rotary valve 1 is switched over to cause the fluid to flow through the first fluid passageway 3 communicated to the first communication orifice 5 and the third communication orifice 7. Further, as the peripheral end faces 31, 34 of the projecting portions 3A, 3B of the casing 3 are pressed against the sealing portion 19 formed of an elastic member, there is provided a sealing state for blocking communication between the first fluid passageway 8 and the second fluid passageway 10.

The rotation of the motor 20 is transmitted from the motor drive shaft 21 to the rotational shafts 25, 27 of the rotary valve 1, whereby the rotor 4 is rotated clockwise. However, even if the fluid is applied conversely to the rotor 4 thereby to attempt to rotate this rotor 4, the rotation of the helical gear 24 to the rotational shaft 25 side of the rotary valve 1 cannot rotate the worm gear 22 of the motor driving shaft 21 side. Therefore, the rotation of the rotor 4 is inhibited and the rotor 4 is held at its position, thus maintaining the sealing state.

This worm gear 22 and the helical gear 24 together constitute a lock mechanism 28 that allows rotation of the rotor 4 by the drive mechanism 15 and inhibits rotation of the rotor 4 due to application thereto of the fluid.

Referring to the lock mechanism 28 in greater details, this is provided on a transmission pathway for the rotational force between the rotor 4 and the drive mechanism 15. More particularly, the lock mechanism 28 consists essentially of the worm gear 22 provided on one longitudinal side of the motor drive shaft 21 of the drive mechanism 15 and the helical gear 24 provided on one longitudinal side of the rotational shaft 25 of the rotor 4, so this mechanism can be incorporated on the transmission pathway between the rotor 4 and the drive mechanism 15.

The rotational shaft 23 of the rotary valve 1 mounts a torsion spring 26 as an elastic member between the rotational shaft 25 on the driving shaft side directly coupled with the motor drive shaft 21 and the driven shaft side rotational shaft 27 for directly rotating the rotary valve 1.

With this, the fluid communication passageway switchover of the rotary valve 1 is effected by transmission of the drive force of the motor 20 via the worm gear 22 to the helical gear 24 and subsequent rotation of the rotor 4 by the rotational shaft 27 of the rotary valve 1 via the torsion spring 26 thereby to cause the partitioning portions 4A, 4B of the rotor 4 to come into contact with the projecting portions 3A, 3B of the casing 3.

The drive force of the motor 20 is transmitted from the drive shaft side rotational shaft 25 to the driven shaft side rotational shaft 27 via the elastic torsion spring 26 until the partitioning portions 4A, 4B of the rotor 4 come into contact with the projecting portions of the casing 3. However, upon contacting of the partitioning portions 4A, 4B of the rotor 4 with the projecting portions 3A, 3B of the casing 3, the drive shaft side rotational shaft 27 cannot be rotated any further. Therefore, after the contacting of the partitioning portions 4A, 4B of the rotor 4 with the projecting portions 3A, 3B of the casing 3, the drive force of the motor rotates only the drive shaft side rotational shaft 25 clockwise (the arrowed direction in FIG. 3) by the torsion spring 26, while the driven shaft rotational shaft 27 of the rotary valve is maintained at its current position. Hence, this torsion spring 26 functions as an "urging mechanism" for maintaining the rotor 4 under the sealing state.

Incidentally, the casing 3 and the rotor 4 are configured such that a gap is always formed between the casing 3 and the outer face of the rotor body 2, thus preventing the casing 4 and the rotor 4 from coming into contact with each other except when the partitioning portions 4A, 4B of the rotor 4 come into contact with the projecting portions 3A, 3B of the casing 3.

With the above arrangement, the rotor 4 can rotate without receiving sliding resistance during switchover of fluid passageway. Hence, the necessary torque can be small and a small motor can be used.

In FIG. 6, the rotary valve 1 is switched over to cause the fluid to flow through the second fluid passageway 10 communicated to the second communication orifice 6 and the third communication orifice 7. Next, the operations of the rotary valve apparatus 1 under this state will be explained.

In FIG. 6, in response to counterclockwise rotation of the rotor 4, the second contacting portion 42 of the first partitioning portion 4A of the rotor 4 comes into contact with the third peripheral end face 33 of the second projecting portion 3B and the third contacting portion 43 of the second partitioning portion 4B comes into contact with the second peripheral end face 32 of the first projecting portion 3A of the casing 3. With these, the rotary valve 1 is switched over to cause the fluid to flow through the second fluid passageway 10 communicated to the second communication orifice 6 and the third communication orifice 7. Further, as the peripheral end faces 32, 33 of the projecting portions 3A, 3B of the casing 3 are pressed against the sealing portion 19 formed of an elastic member and provided in the partitioning portions 4A, 4B of the rotor, there is provided a sealing state for blocking communication between the first fluid passageway 8 and the second fluid passageway 10.

In the above, the rotation of the motor 20 is transmitted from the motor drive shaft 21 to the rotational shaft 27 of the rotary valve 1, whereby the rotor 4 is rotated counterclockwise. However, even if the fluid is applied conversely to the rotor 4 thereby to attempt to rotate this rotor 4, the lock mechanism 28 acts to inhibit the rotation of the rotor 4, and the rotor 4 is held at its position, thus maintaining the sealing state.

The drive force of the motor 20 is transmitted from the drive shaft side rotational shaft 25 to the driven shaft side rotational shaft 27 via the elastic torsion spring 26 until the partitioning portions 4A, 4B of the rotor 4 come into contact with the projecting portions of the casing 3. However, upon contacting of the partitioning portions 4A, 4B of the rotor 4 with the projecting portions 3A, 3B of the casing 3, the drive shaft side rotational shaft 27 cannot be rotated any further. Therefore, after the contacting of the partitioning portions 4A, 4B of the rotor 4 with the projecting portions 3A, 3B of the casing 3, the drive force of the motor 20 rotates only the drive shaft side rotational shaft 25 counterclockwise (the arrowed direction in FIG. 5) by the torsion spring 26, while the driven shaft rotational shaft 27 of the rotary valve is maintained at its current position. Hence, this torsion spring 26 functions as the "urging mechanism" for maintaining the rotor 4 under the sealing state.

Preferably, the motor lock torque of the motor 20 provided in the drive mechanism 15 switching over the rotary valve 1 in the manner described above is set as a motor torque greater than the motor torque of the sealing face pressure required by the rotary valve 1.

With the above arrangement, an amount of motor lock torque exceeding the motor torque of the sealing face pressure required by the rotary valve 1 is accumulated in the torsion spring 26, so that this torsion spring 26 urges the partitioning portions 4A, 4B of the rotor against the projecting portions 3A, 3B of the casing 3, thereby to improve the sealing performance of the rotary valve 1.

Under the sealing state where the partitioning portions 4A, 4B of the rotor 4 are placed in contact with the projecting portions 3A, 3B of the casing, when the motor 20 is stopped, the motor torque is removed, whereby the rotational shaft 23 of the rotary valve 1 will try to rotate in the peripheral direction away from the projecting portions 3A, 3B of the casing 3. However, this rotation of the rotational shaft 23 of the rotary valve 1 is prevented by the worm gear 22 of the lock mechanism 28 provided on the motor drive shaft 21. Further, the amount of torque accumulated in the torsion spring 26 serves as a force for pressing the partitioning portions 4A, 4B of the rotor 4 against the peripheral end faces of the projecting portions 3A, 3B of the casing 3, so that the sealing state of the rotary valve 1 is maintained.

The relationship among the motor torque and motor current, the motor torque required for sealing and the motor lock torque for actually stopping the motor is illustrated by the graph shown in FIG. 7. That is, as shown in FIG. 7, the motor current and the motor torque are in direct proportional relationship. So, once the motor lock torque greater than the motor torque required for sealing is decided, then, setting is possible such that the current supply to the motor will be stopped upon detection of a motor lock current corresponding to this motor lock torque.

Further, a time period required from start of driving of the motor to its reaching the motor torque greater than the motor torque required for sealing may be determined in advance. Then, by interpreting lapse of this required time period as completion of locking of the motor, the electric current supply to the motor may be stopped. In this way, the need for determining the motor current can be eliminated, so that the motor control scheme can be even more simplified.

Further alternatively to the above, other setting arrangements for stopping the current supply to the motor are possible. For instance, a rotational angle of the shaft driven by the motor is determined by a potentiometer, a hall sensor, a magnet pickup, etc. or the temperature of the motor such as its brush is detected. So, upon such determination or detection, the power supply to the motor may be stopped.

Embodiment 2

The lock mechanism can be constituted by employing not the worm gear, but a ratchet mechanism on the motor drive shaft. Incidentally, since a ratchet mechanism has only one direction in its rotation, a separate power transmission mechanism will be needed for rotating the rotational shaft of the rotary valve.

INDUSTRIAL APPLICABILITY

The rotary valve apparatus according to the present invention can be used in e.g. a piping for flowing various kinds of fluid such as a gas, a liquid, etc. and can be used also for fluid control in a vehicle or the like.

The invention claimed is:

1. A rotary valve apparatus comprising:
a casing having a fluid passageway;
a rotor rotatably mounted in the casing and configured to control, by rotation thereof, a flow state of fluid flowing in the fluid passageway;
a drive mechanism for rotating the rotor; and
a lock mechanism configured to allow transmission of a rotational force from the drive mechanism to the rotor and to inhibit rotation of the rotor under non-rotation driving state of the drive mechanism;
wherein said casing includes an accommodating space for accommodating said rotor;
said accommodating space is surrounded by an inner peripheral wall coaxial with a rotational shaft of said rotor;
said inner peripheral wall includes a first projecting portion and a second projecting portion that project into said accommodating space and oppose to each other across said rotational shaft;
leading ends of said first projecting portion and said second projecting portion form an arcuate shape coaxial with said rotational shaft in a cross section perpendicular to said rotational shaft;
said fluid passageway includes at least a first fluid passageway and a second fluid passageway;
said rotor is configured to control, by rotation thereof, the flow state of the fluid such that the fluid is caused to flow through either one of said first fluid passageway and said second fluid passageway;
said first projecting portion includes a first peripheral end face on one side in the peripheral direction of this first projecting portion and a second peripheral end face on the other side in the peripheral direction of this first projecting portion;
said second projecting portion includes a third peripheral end face located on one side in the peripheral direction of this second projecting portion and in opposition to said first peripheral end face and a fourth peripheral end face located on the other side in the peripheral direction of this second projecting portion and in opposition to said second peripheral end face;
said rotor includes a first partitioning portion disposed on one side in the direction perpendicular to said rotational shaft across this rotational shaft and a second partitioning portion disposed on the other side in the direction perpendicular to said rotational shaft;

said first partitioning portion and said second partitioning portion each have a planar shape extending at least in the axial direction of said rotational shaft;

said first partitioning portion includes a first contacting portion formed in one side thereof contactable with at least said first peripheral end face of said first projecting portion and a second contacting portion formed on the other side thereof contactable with at least said third peripheral end face of said second projecting portion;

said second partitioning portion includes a third contacting portion formed in one side thereof contactable with at least said second peripheral end face of said first projecting portion and a fourth contacting portion formed on the other side thereof contactable with at least said fourth peripheral end face of said second protecting portion;

in response to rotation of said rotor in one direction said first contacting portion of said first partitioning portion comes into contact with said first peripheral end face of said first projecting portion and said fourth contacting portion of said second partitioning portion comes into contact with said fourth peripheral end face of said second projecting portion, thereby to provide a sealing state for blocking communication between said first fluid passageway and said second fluid passageway; and in response to rotation of said rotor in the other direction, said second contacting portion of said first partitioning portion comes into contact with said third peripheral end face of said second projecting portion and said third contacting portion of said second partitioning portion comes into contact with said second peripheral end face of said first projecting portion, thereby to provide a sealing state for blocking communication between said first fluid passageway and said second fluid passageway.

2. The rotary valve apparatus according to claim 1, wherein said lock mechanism is incorporated in a rotational force transmission pathway from said drive mechanism.

3. The rotary valve apparatus according to claim 1, wherein said lock mechanism inhibits the rotation of the rotor even when the fluid pressure of the fluid is applied to this rotor.

4. The rotary valve apparatus according to claim 1, wherein said fluid passageway includes a first communication orifice, a second communication orifice, and a third communication orifice;

said first fluid passageway includes said first communication orifice, said third communication orifice and a first communication passageway communicating said first communication orifice to said third communication orifice; and said second fluid passageway includes said second communication orifice, said third communication orifice and the communication passageway communicating said second communication orifice to said third communication orifice.

5. The rotary valve apparatus according to claim 1, wherein said lock mechanism includes a worm gear.

6. A rotary valve apparatus comprising:
a casing having a fluid passageway;
a rotor rotatably mounted in the casing and configured to control, by rotation thereof, a flow state of fluid flowing in the fluid passageway;
a drive mechanism for rotating the rotor; and
a lock mechanism configured to allow transmission of a rotational force from the drive mechanism to the rotor and to inhibit rotation of the rotor under non-rotation driving state of the drive mechanism;

wherein said casing includes an accommodating space for accommodating said rotor;

said accommodating space is surrounded by an inner peripheral wall coaxial with a rotational shaft of said rotor;

said inner peripheral wall includes a first projecting portion and a second projecting portion that project into said accommodating space and oppose to each other across said rotational shaft;

leading ends of said first projecting portion and said second projecting portion form an arcuate shape coaxial with said rotational shaft in a cross section perpendicular to said rotational shaft;

a sealing portion is rendered into a sealing state when said rotor and said casing come into contact with each other as a result of the rotation of the rotor;

an urging mechanism is provided between said lock mechanism and said rotor for maintaining said rotor under said sealing state;

said fluid passageway includes at least a first fluid passageway and a second fluid passageway;

said rotor is configured to control, by rotation thereof, the flow state of the fluid such that the fluid is caused to flow through either one of said first fluid passageway and said second fluid passageway;

said first protecting portion includes a first peripheral end face on one side in the peripheral direction of this first protecting portion and a second peripheral end face on the other side in the peripheral direction of this first protecting portion;

said second protecting portion includes a third peripheral end face located on one side in the peripheral direction of this second protecting portion and in opposition to said first peripheral end face and a fourth peripheral end face located on the other side in the peripheral direction of this second protecting portion and in opposition to said second peripheral end face;

said rotor includes a first partitioning portion disposed on one side in the direction perpendicular to said rotational shaft across this rotational shaft and a second partitioning portion disposed on the other side in the direction perpendicular to said rotational shaft;

said first partitioning portion and said second partitioning portion each have a planar shape extending at least in the axial direction of said rotational shaft;

said first partitioning portion includes a first contacting portion formed in one side thereof contactable with at least said first peripheral end face of said first projecting portion and a second contacting portion formed on the other side thereof contactable with at least said third peripheral end face of said second projecting portion;

said second partitioning portion includes a third contacting portion formed in one side thereof contactable with at least said second peripheral end face of said first projecting portion and a fourth contacting portion formed on the other side thereof contactable with at least said fourth peripheral end face of said second protecting portion;

in response to rotation of said rotor in one direction, said first contacting portion of said first partitioning portion comes into contact with said first peripheral end face of said first projecting portion and said fourth contacting portion of said second partitioning portion comes into contact with said fourth peripheral end face of said second projecting portion, thereby to provide a sealing state for blocking communication between said first fluid passageway and said second fluid passageway; and in response to rotation of said rotor in the other direction, said second contacting portion of said first partitioning portion comes into contact with said third peripheral end face of said second projecting portion and said third contacting portion of said second partitioning portion comes into contact with said second peripheral end face of said first projecting portion, thereby to provide a sealing state for blocking communication between said first fluid passageway and said second fluid passageway.

7. The rotary valve apparatus according to claim 6, wherein said urging mechanism includes a spring.

8. The rotary valve apparatus according to claim 6, wherein said sealing portion includes an elastic member.

* * * * *